US012520749B2

(12) United States Patent
Guo

(10) Patent No.: US 12,520,749 B2
(45) Date of Patent: *Jan. 13, 2026

(54) STRING TRIMMER AND TRIMMER HEAD

(71) Applicant: Nanjing Chervon Industry Co., Ltd., Nanjing (CN)

(72) Inventor: Jianpeng Guo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 471 days.

This patent is subject to a terminal disclaimer.

(21) Appl. No.: 17/551,225

(22) Filed: Dec. 15, 2021

(65) Prior Publication Data

US 2022/0104430 A1 Apr. 7, 2022

Related U.S. Application Data

(63) Continuation of application No. PCT/CN2020/096354, filed on Jun. 16, 2020.

(30) Foreign Application Priority Data

Jun. 17, 2019 (CN) .......................... 20191052091.1

(51) Int. Cl.
*A01D 34/416* (2006.01)
*A01D 101/00* (2006.01)
(52) U.S. Cl.
CPC ..... *A01D 34/4162* (2013.01); *A01D 34/4166* (2013.01); *A01D 2101/00* (2013.01)

(58) Field of Classification Search
CPC .............. A01D 34/416; A01D 34/4162; A01D 34/4166; A01D 2101/00; A01D 34/4161;
(Continued)

(56) References Cited

U.S. PATENT DOCUMENTS 4,419,822 A 12/1983 Harris
4,888,871 A * 12/1989 Engelbrecht ....... A01D 34/4162
30/276
(Continued)

FOREIGN PATENT DOCUMENTS

CN 105815028 A 8/2016
CN 109379973 A 12/2017
(Continued)

OTHER PUBLICATIONS

Office Action from Canadian application No. 3,144,111, dated Mar. 20, 2024, 8 pp.
(Continued)

*Primary Examiner* — Adam J Eiseman
*Assistant Examiner* — Robert D Cornett
(74) *Attorney, Agent, or Firm* — Greenberg Traurig, LLP

(57) ABSTRACT

A string trimmer includes a trimmer head and a driving device having a motor for driving the trimmer head to rotate around a rotation axis. The trimmer head includes a spool, a head housing formed with an accommodating space, and a transmission member mounted to the spool. The spool is at least partially accommodated in the accommodating space. The transmission member includes a driving portion. The head housing is formed with a mating portion to mate with the driving portion.

19 Claims, 11 Drawing Sheets

(58) Field of Classification Search
CPC ............ A01D 34/4163; A01D 34/4165; A01D 34/4167; A01D 34/4168; A01D 69/06; A01D 75/20
USPC .......................................................... 30/276
See application file for complete search history.

(56) References Cited

U.S. PATENT DOCUMENTS

| | | | |
|---|---|---|---|
| 7,797,839 | B2 | 9/2010 | Proulx |
| 2009/0260237 | A1 | 10/2009 | Alliss |
| 2016/0183452 | A1 | 6/2016 | Kullberg |
| 2016/0249529 | A1* | 9/2016 | Ma .................... A01D 34/4161 30/276 |
| 2017/0347523 | A1 | 12/2017 | Alliss |
| 2018/0098492 | A1 | 4/2018 | Guo |
| 2020/0128728 | A1 | 4/2020 | Guo |
| 2021/0378173 | A1 | 12/2021 | Cholst |
| 2022/0104431 | A1 | 4/2022 | Guo |

FOREIGN PATENT DOCUMENTS

| | | |
|---|---|---|
| CN | 108135129 A | 6/2018 |
| CN | 109691287 A | 4/2019 |
| CN | 111096141 A | 4/2023 |
| EP | 2798934 A1 | 11/2014 |
| WO | 2016173657 A1 | 11/2016 |

OTHER PUBLICATIONS

ISA/CN, International Search Report issued on PCT application No. PCT/CN2020/096354, dated Sep. 27, 2020, 4 pages.
ISA/CN, English translation of International Search Report issued on PCT application No. PCT/CN2020/096354, dated Sep. 27, 2020, 2 pages.
EPO, extended European search report issued on European patent application No. 20826472.1, dated Jun. 20, 2022, 7 pages.
CIPO, office action issued on Canadian patent application No. 3,144,111, dated Mar. 15, 2023, 17 pages.
Non-final Office Action from U.S. Appl. No. 17/551,282, dated Mar. 11, 2024, 26 pp.
Non-final Office Action from U.S. Appl. No. 17/551,282, dated Mar. 26, 2025, 15 pp.
International Search Report and Written Opinion of application number PCT/CN20/96353, dated Sep. 21, 2020, 6 pp.
Written Opinion of international application number PCT/CN20/96354, dated Dec. 21, 2017, 4 pp.

* cited by examiner

STRING TRIMMER AND TRIMMER HEAD

RELATED APPLICATION INFORMATION

This application is a continuation of International Application Number PCT/CN2020/096354, filed on Jun. 16, 2020, through which this application also claims the benefit under 35 U.S.C. § 119(a) of Chinese Patent Application No. CN 201910520911.X, filed on Jun. 17, 2019, the disclosures of which are incorporated herein by reference in their entirety.

BACKGROUND

A string trimmer can be used for trimming the grass in the lawn of villas and gardens. At present, the string trimmer on the market mainly uses tapping or a switch to control a spool and head housing of a trimmer head to produce a speed difference to feed the line. For current string trimmers, users cannot accurately feed the length of the line according to actual needs. In fact, none of the current string trimmer heads can realize automatic string feeding in the true sense.

Generally speaking, the trimmer head with the automatic feeding function generally causes the trimming line to be released by causing the head housing and the spool to rotate relative to each other. There are many ways to make the head housing and the spool rotate relative to each other. In the related art, the automatic feeding of the string trimmer generally requires the string trimmer to be controlled to feed the line according to the human judgment of the operator. That is, when the operator observes that the length of the trimming line changes and the trimming efficiency is reduced, the string trimmer is manually controlled to feed. This includes the control of the string trimmer to accelerate or decelerate through the feeding switch for the speed difference between the head housing and the spool, or through tapping the trimmer head to cause the speed difference between the head housing and the spool to achieve the line feeding. For this type of string trimmer, when the line is automatically feeding, the trimmer head will produce a large speed difference when it is driven, so as to achieve a speed difference between the head housing and the spool. As for some string trimmers with an automatic feeding function in related technologies, they are set so that when the string trimmer is turned on or off, there will also be a speed difference between the head housing and the spool to achieve line feeding, which is not effective and reliable line feeding based on actual needs.

Under the premise that the trimming line itself has an effective cutting length, this kind of line feeding requires the user to cut off the excess line, which actually causes a certain degree of waste of resources, and it will cause some unnecessary troubles to the user in the actual operation process, and seriously affect the convenience of the user's operation.

There are also some documents disclosed that a sensor is installed inside the trimmer head to sense the length of the trimming line and transmit the signal to the control unit to control the realization of the acceleration or deceleration of the trimmer head. It also requires the trimmer head to have a large speed difference, and the speed difference is generally required to be more than 30%, and the string trimmer that senses the signal and controls the feeding through the sensor is not reflected in the products of the related technology. It is obtained through multi-party demonstration that in the actual feeding process, there will generally be situations where the line cannot be put out or the line is too long. The reliability of this type of string trimmer is extremely poor, and it cannot adapt to the more complicated working conditions when the string trimmer is working.

SUMMARY

In one example, a string trimmer includes a trimmer head; a driving device including a motor for driving the trimmer head to rotate around a rotation axis; the trimmer head includes: a spool for winding a trimming line; a head housing, formed with an accommodating space, and the spool is at least partially accommodated in the accommodating space; a transmission member, mounted to the spool, and the transmission member includes a driving portion for driving the head housing to rotate synchronously with the spool; wherein, the head housing is formed with a mating portion to mate with the driving portion; the mating portion includes a first teeth distributed around a rotation axis; the first teeth includes a tooth surface that mates with the driving portion and connects a tooth top and a tooth root of the first teeth, and the tooth surface passes through the straight line of the rotation axis and the included angle between the tooth top and the tooth root and the tooth surface is greater than or equal to 0° and less than or equal to 45°; wherein, the trimmer head includes a first equilibrium state in a working state and a second equilibrium state in a line-feeding state; when the trimmer head rotates around the rotation axis and the transmission member rotates with the spool around the rotation axis, the transmission member generates a centrifugal force along a straight line, and the mating portion contacts the driving portion and imparts an acting force to the driving portion; The acting force has a first component force along the direction perpendicular to the straight line and a second component force along the straight line direction, and the second component force is also opposite to the direction of the centrifugal force so as to prevent the transmission member from moving in the direction of the straight line; when the second component force is greater than the centrifugal force of the transmission member along the direction of the first straight line, the trimmer head is in a first equilibrium state; when the second component force is less than the centrifugal force of the transmission member along the direction of the first straight line, the trimmer head is in a second equilibrium state.

In one example, the trimmer head rotates in constant speed when the trimmer head is in a working state or a line-feeding state.

In one example, the head housing is formed with an outer threading aperture for inserting the trimming line into the spool, and the spool is formed with an inner threading aperture that mates with the outer threading aperture; when the inner threading aperture and the outer threading aperture are located in a same radial direction, the trimming line can pass through the outer threading aperture and the inner threading aperture in sequence.

In one example, the transmission member is provided with a transmission aperture and the transmission member is sleeved on the spool through the transmission aperture and can rotate with the spool synchronously.

In one example, a limiting portion is also formed or coupled to the spool, and the limiting portion can limit the displacement of the transmission member around the circumference of the rotation axis.

In one example, on a symmetry plane passing through the rotation axis, the transmission member passes the rotation axis and the center of gravity of the transmission member deviates from the symmetry plane.

In one example, the centrifugal force generated by the transmission member in the direction of the straight line is constant when the transmission member rotates with the spool.

In one example, the trimming line has an effective length extending from the accommodating space, and the trimming line has a preset value within an effective length range; when the effective length of the trimming line is less than the preset value, the second component force is less than the centrifugal force; when the effective length of the trimming line is greater than the preset value, the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; when the effective length of the trimming line is less than the preset value, a summation of the second component force and the friction force is less than the centrifugal force; when the effective length of the trimming line is greater than the preset value, the summation of the frictional force and the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; the spool is also formed or coupled with a receiving groove, and a biasing element is arranged in the receiving groove; one end of the biasing element abuts against the bottom of the receiving groove, and the other end abuts against the transmission member; a biasing force opposite to the direction of the centrifugal force is also formed between the transmission member and the receiving groove; when the effective length of the trimming line is less than the preset value, the summation of the second component force and the friction force is less than the centrifugal force, where the friction force is the biasing force; when the effective length of the trimming line is greater than the preset value, the summation of the friction force and the second component force is greater than the centrifugal force, where the friction force is the biasing force.

In one example, the head housing is formed or coupled with a second teeth that can be used for resetting the transmission member back.

In one example, the first teeth and the second teeth are staggered around the rotation axis.

In one example, in a circumferential range around the rotation axis, the second teeth have a tooth surface that is protruded toward the rotation axis.

In one example, a limiting portion is formed on the spool to limit the rotation of the transmission member around the rotation axis, and the limiting portion is symmetrically arranged with respect to a symmetry plane passing through the first straight line; the limiting portion is formed to provide a sliding rail on which the transmission member slides; in a linear direction perpendicular to the rotation axis, the limiting member and the limiting portion include at least two contact surfaces.

In one example, when the trimmer head is driven by the motor to rotate around the rotation axis, the transmission member has a friction force relative to the spool in the direction of a straight line perpendicular to the rotation axis, and the direction of the frictional force is opposite to the direction of the centrifugal force generated by the transmission member.

In one example, the spool is further formed with or coupled to a receiving groove, and a biasing element is arranged in the receiving groove; one end of the biasing element abuts against the bottom of the receiving groove, and the other end abuts against the transmission member.

In one example, a string trimmer includes: a trimmer head; a driving device, including a motor for driving the trimmer head to rotate around a rotation axis; the trimmer head includes: a spool for winding the trimming line; a head housing, formed with an accommodating space, and the spool is at least partially accommodated in the accommodating space; a transmission member, mounted to the spool, and the transmission member includes a driving portion for driving the head housing to rotate with the spool synchronously; the head housing is formed with a mating portion to mate with the driving portion; wherein, when the trimmer head rotates around the rotation axis and the transmission member rotates with the spool around the rotation axis, the transmission member generates a centrifugal force along a straight line; the mating portion and the driving portion contacts and applies an acting force to the driving portion; the acting force has a first component force along a direction perpendicular to the straight line and a second component force along the direction of the straight line and opposite to the direction of the centrifugal force so as to prevent the transmission member from moving along the straight line.

In one example, the trimmer head includes a first equilibrium state in a working state and a second equilibrium state in a line-feeding state; when the second component force is greater than the centrifugal force of the transmission member along the first straight line, the trimmer head is in the first equilibrium state; when the second component force is less than the centrifugal force of the transmission member along the first linear direction, the trimmer head is in the second equilibrium state.

In one example, when the trimmer head is in the working state or the line-feeding state, the rotation speed of the trimmer head is constant.

In one example, the head housing is formed with an outer threading aperture for inserting the trimming line into the spool, and the spool is formed with an inner threading aperture that mates with the outer threading aperture; when the inner threading aperture and the outer threading aperture are located in a same radial direction, the trimming line can pass through the outer threading aperture and the inner threading aperture in sequence.

In one example, the transmission member is provided with a transmission aperture and the transmission member is sleeved on the spool through the transmission aperture and can rotate with the spool synchronously.

In one example, a limiting portion is also formed or coupled to the spool, and the limiting portion can limit the displacement of the transmission member around the circumference of the rotation axis.

In one example, on a symmetry plane passing through the rotation axis, the transmission member passes the rotation axis and the center of gravity of the transmission member deviates from the symmetry plane.

In one example, the centrifugal force generated by the transmission member in the direction of the straight line is constant when the transmission member rotates with the spool.

In one example, the trimming line has an effective length extending from the accommodating space, and the trimming line has a preset value within an effective length range; when the effective length of the trimming line is less than the preset value, the second component force is less than the centrifugal force; when the effective length of the trimming line is greater than the preset value, the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; when the effective length of the trimming line is less than the preset value, a summation of the second component force and the friction force is less than the centrifugal force; when the effective length of the trimming line is greater than the preset value, the summation of the frictional force and the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; the spool is also formed or coupled with a receiving groove, and a biasing element is arranged in the receiving groove; one end of the biasing element abuts against the bottom of the receiving groove, and the other end abuts against the transmission member; a biasing force opposite to the direction of the centrifugal force is also formed between the transmission member and the receiving groove; when the effective length of the trimming line is less than the preset value, the summation of the second component force and the friction force is less than the centrifugal force, where the friction force is the biasing force; when the effective length of the trimming line is greater than the preset value, the summation of the second component force and the friction force is greater than the centrifugal force, where the friction force is the biasing force.

In one example, the mating portion includes a first teeth distributed around a rotation axis; the first teeth include a tooth surface that mates with the driving portion and connects a tooth top and a tooth root of the first teeth, and the tooth surface passes through the straight line of the rotation axis and the included angle between the tooth top and the tooth root and the tooth surface is greater than or equal to 0° and less than or equal to 45°.

In one example, the head housing is formed or coupled with a second teeth that can be used for resetting the transmission member back.

In one example, the first teeth and the second teeth are staggered around the rotation axis.

In one example, in a circumferential range around the rotation axis, the second teeth have a tooth surface that is protruded toward the rotation axis.

In one example, a limiting portion is formed on the spool to limit the rotation of the transmission member around the rotation axis, and the limiting portion is symmetrically arranged with respect to a symmetry plane passing through the first straight line; the limiting portion is formed to provide a sliding rail on which the transmission member slides; in a linear direction perpendicular to the rotation axis, the limiting member and the limiting portion include at least two contact surfaces.

In one example, when the trimmer head is driven by the motor to rotate around the rotation axis, the transmission member has a friction force relative to the spool in the direction of a straight line perpendicular to the rotation axis, and the direction of the frictional force is opposite to the direction of the centrifugal force generated by the transmission member.

In one example, the spool is further formed with or coupled to a receiving groove, and a biasing element is arranged in the receiving groove; one end of the biasing element abuts against the bottom of the receiving groove, and the other end abuts against the transmission member.

In one example, a trimmer head is configured for string trimmer and is capable of being driven to rotate around a rotation axis, the trimmer head includes: a spool for winding a trimming line; a head housing, formed with an accommodating space, and the spool is at least partially accommodated in the accommodating space; a transmission member, mounted to the spool, and the transmission member includes a driving portion for driving the head housing to rotate synchronously with the spool; wherein, the head housing is formed with a mating portion to mate with the driving portion; the mating portion includes a first teeth distributed around a rotation axis; the first teeth includes a tooth surface that mates with the driving portion and connects a tooth top and a tooth root of the first teeth, and the tooth surface passes through the straight line of the rotation axis and the included angle between the tooth top and the tooth root and the tooth surface is greater than or equal to 0° and less than or equal to 45°; wherein, the trimmer head includes a first equilibrium state in a working state and a second equilibrium state in a line-feeding state; when the trimmer head rotates around the rotation axis and the transmission member rotates with the spool around the rotation axis, the transmission member generates a centrifugal force along a straight line, and the mating portion contacts the driving portion and imparts an acting force to the driving portion; The acting force has a first component force along the direction perpendicular to the straight line and a second component force along the straight line direction, and the second component force is also opposite to the direction of the centrifugal force so as to prevent the transmission member from moving in the direction of the straight line; when the second component force is greater than the centrifugal force of the transmission member along the direction of the first straight line, the trimmer head is in a first equilibrium state; when the second component force is less than the centrifugal force of the transmission member along the direction of the first straight line, the trimmer head is in a second equilibrium state; wherein, the head housing is formed or coupled with a second teeth that can be used for resetting the transmission member back; the first teeth and the second teeth are staggered around the rotation axis; in a circumferential range around the rotation axis, the second teeth has a tooth surface that is protruded toward the rotation axis.

In one example, the trimmer head rotates in constant speed when the trimmer head is in a working state or a line-feeding state.

In one example, the head housing is formed with an outer threading aperture for inserting the trimming line into the spool, and the spool is formed with an inner threading aperture that mates with the outer threading aperture; when the inner threading aperture and the outer threading aperture are located in a same radial direction, the trimming line can pass through the outer threading aperture and the inner threading aperture in sequence.

In one example, the transmission member is provided with a transmission aperture and the transmission member is sleeved on the spool through the transmission aperture and can rotate with the spool synchronously.

In one example, a limiting portion is also formed or coupled to the spool, and the limiting portion can limit the displacement of the transmission member around the circumference of the rotation axis.

In one example, on a symmetry plane passing through the rotation axis, the transmission member passes the rotation axis and the center of gravity of the transmission member deviates from the symmetry plane.

In one example, the centrifugal force generated by the transmission member in the direction of the straight line is constant when the transmission member rotates with the spool.

In one example, the trimming line has an effective length extending from the accommodating space, and the trimming line has a preset value within an effective length range; when the effective length of the trimming line is less than the preset value, the second component force is less than the centrifugal force; when the effective length of the trimming line is greater than the preset value, the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; when the effective length of the trimming line is less than the preset value, a summation of the second component force and the friction force is less than the centrifugal force; when the effective length of the trimming line is greater than the preset value, the summation of the frictional force and the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; the spool is also formed or coupled with a receiving groove, and a biasing element is arranged in the receiving groove; one end of the biasing element abuts against the bottom of the receiving groove, and the other end abuts against the transmission member; a biasing force opposite to the direction of the centrifugal force is also formed between the transmission member and the receiving groove; when the effective length of the trimming line is less than the preset value, the summation of the second component force and the friction force is less than the centrifugal force, where the friction force is the biasing force; when the effective length of the trimming line is greater than the preset value, the summation of the friction force and the second component force is greater than the centrifugal force, where the friction force is the biasing force.

In one example, a limiting portion is formed on the spool to limit the rotation of the transmission member around the rotation axis, and the limiting portion is symmetrically arranged with respect to a symmetry plane passing through the first straight line; the limiting portion is formed to provide a sliding rail on which the transmission member slides; in a linear direction perpendicular to the rotation axis, the limiting member and the limiting portion include at least two contact surfaces.

In one example, when the trimmer head is driven by the motor to rotate around the rotation axis, the transmission member has a friction force relative to the spool in the direction of a straight line perpendicular to the rotation axis, and the direction of the frictional force is opposite to the direction of the centrifugal force generated by the transmission member.

In one example, the spool is further formed with or coupled to a receiving groove, and a biasing element is arranged in the receiving groove; one end of the biasing element abuts against the bottom of the receiving groove, and the other end abuts against the transmission member.

In one example a trimmer head, configured for string trimmer, is capable of being driven to rotate around a rotation axis to achieve grass trimming, the trimmer head including: a spool for winding a trimming line; a head housing, formed with an accommodating space, and the spool is at least partially accommodated in the accommodating space; a transmission member, mounted to the spool, and the transmission member includes a driving portion for driving the head housing to rotate synchronously with the spool; the head housing is formed with a mating portion to mate with the driving portion; wherein when the trimmer head rotates around the rotation axis and the transmission member rotates with the spool around the rotation axis, the transmission member generates a centrifugal force along a straight line, and the mating portion contacts the driving portion and imparts an acting force to the driving portion; The acting force has a first component force along the direction perpendicular to the straight line and a second component force along the straight line direction, and the second component force is also opposite to the direction of the centrifugal force so as to prevent the transmission member from moving in the direction of the straight line.

In one example, the trimmer head includes a first equilibrium state in a working state and a second equilibrium state in a line-feeding state; when the second component force is greater than the centrifugal force of the transmission member along the direction of the first straight line, the trimmer head is in a first equilibrium state; when the second component force is less than the centrifugal force of the transmission member along the direction of the first straight line, the trimmer head is in a second equilibrium state;

In one example, the trimmer head rotates in constant speed when the trimmer head is in a working state or a line-feeding state.

In one example, the head housing is formed with an outer threading aperture for inserting the trimming line into the spool, and the spool is formed with an inner threading aperture that mates with the outer threading aperture; when the inner threading aperture and the outer threading aperture are located in a same radial direction, the trimming line can pass through the outer threading aperture and the inner threading aperture in sequence.

In one example, the transmission member is provided with a transmission aperture and the transmission member is sleeved on the spool through the transmission aperture and can rotate with the spool synchronously.

In one example, a limiting portion is also formed or coupled to the spool, and the limiting portion can limit the displacement of the transmission member around the circumference of the rotation axis.

In one example, on a symmetry plane passing through the rotation axis, the transmission member passes the rotation axis and the center of gravity of the transmission member deviates from the symmetry plane.

In one example, the centrifugal force generated by the transmission member in the direction of the straight line is constant when the transmission member rotates with the spool.

In one example, the trimming line has an effective length extending from the accommodating space, and the trimming line has a preset value within an effective length range; when the effective length of the trimming line is less than the preset value, the second component force is less than the centrifugal force; when the effective length of the trimming line is greater than the preset value, the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; when the effective length of the trimming line is less than the preset value, a summation of the second component force and the friction force is less than the centrifugal force; when the effective length of the trimming line is greater than the preset value, the summation of the frictional force and the second component force is greater than the centrifugal force.

In one example, the trimming line has an effective length extending from the accommodating space, and the trimming line has a preset value within the effective length range; when the trimmer head is driven by the motor to rotate around the rotation axis, the transmission member has a friction force in direction perpendicular to a straight line the rotation axis relative to the spool, and the friction force is in the opposite direction of the centrifugal force generated by the transmission member; the spool is also formed or coupled with a receiving groove, and a biasing element is arranged in the receiving groove; one end of the biasing element abuts against the bottom of the receiving groove, and the other end abuts against the transmission member; a biasing force opposite to the direction of the centrifugal force is also formed between the transmission member and the receiving groove; when the effective length of the trimming line is less than the preset value, the summation of the second component force and the friction force is less than the centrifugal force, where the friction force is the biasing force; when the effective length of the trimming line is greater than the preset value, the summation of the second component force and the friction force is greater than the centrifugal force, where the friction force is the biasing force.

In one example, the mating portion includes a first teeth distributed around a rotation axis; the first teeth includes a tooth surface that mates with the driving portion and connects a tooth top and a tooth root of the first teeth, and the tooth surface passes through the straight line of the rotation axis and the included angle between the tooth top and the tooth root and the tooth surface is greater than or equal to 0° and less than or equal to 45°;

In one example, the head housing is formed or coupled with a second teeth that can be used for resetting the transmission member back.

In one example, the first teeth and the second teeth are staggered around the rotation axis.

In one example, in a circumferential range around the rotation axis, the second teeth have a tooth surface that is protruded toward the rotation axis.

In one example, a limiting portion is formed on the spool to limit the rotation of the transmission member around the rotation axis, and the limiting portion is symmetrically arranged with respect to a symmetry plane passing through the first straight line; the limiting portion is formed to provide a sliding rail on which the transmission member slides; in a linear direction perpendicular to the rotation axis, the limiting member and the limiting portion include at least two contact surfaces.

In one example, when the trimmer head is driven by the motor to rotate around the rotation axis, the transmission member has a friction force relative to the spool in the direction of a straight line perpendicular to the rotation axis, and the direction of the frictional force is opposite to the direction of the centrifugal force generated by the transmission member.

In one example, the spool is further formed with or coupled to a receiving groove, and a biasing element is arranged in the receiving groove; one end of the biasing element abuts against the bottom of the receiving groove, and the other end abuts against the transmission member.

By setting the transmission member matched with the driving portion, and through pure mechanical mating, the trimmer head itself will automatically feed the line when the trimming line is shortened to the preset length, so as to meet the demand for the length of the line during trimming. There is no need for manual judgment of the line feeding conditions, which improve the reliability and convenience of the line feeding of the string trimmer.

DETAILED DESCRIPTION

Figure 1:
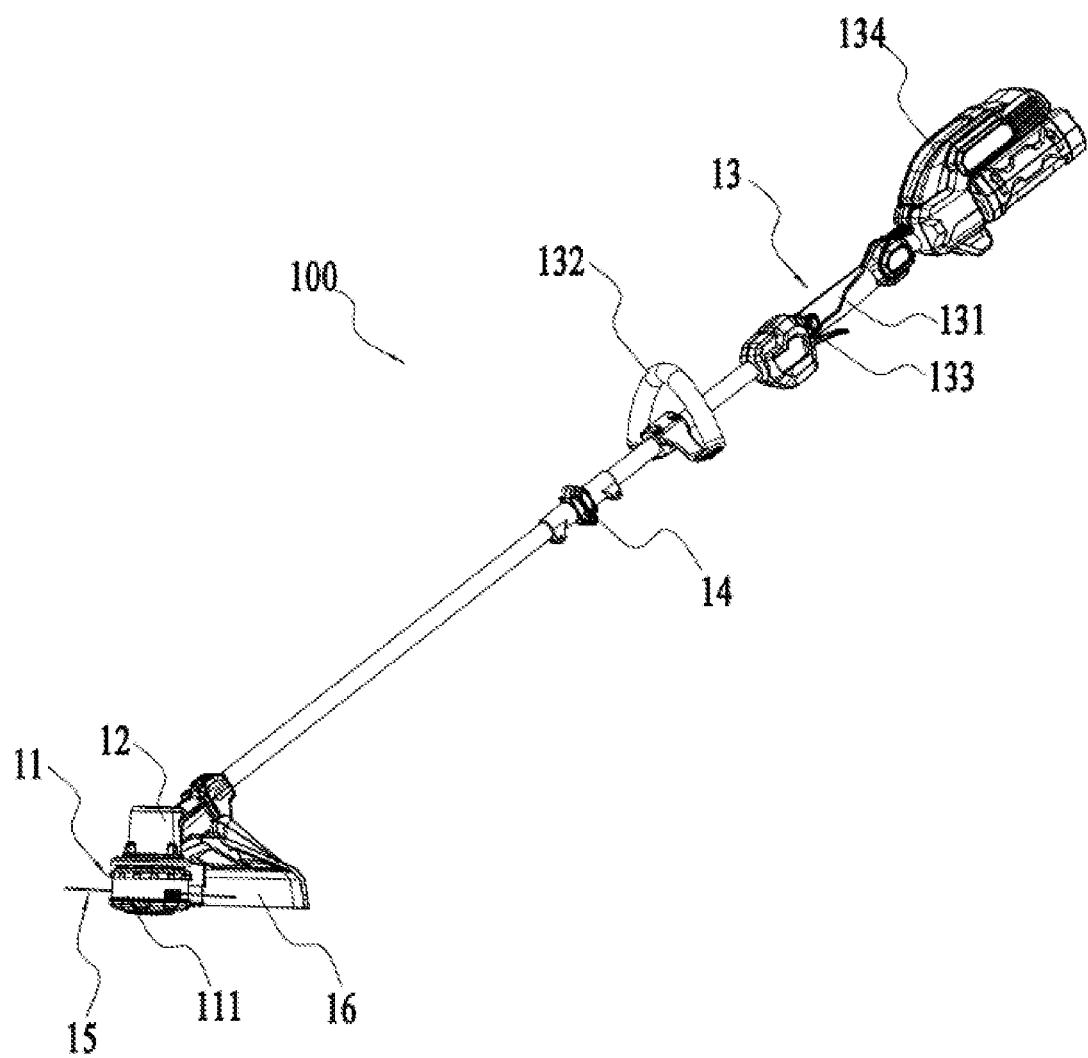
FIG. 1 is a perspective view of a string trimmer.

A string trimmer 100 shown in FIG. 1 includes a trimmer head 11, a driving device 12, an operating device 13, and a connecting device 14.

Figure 2:
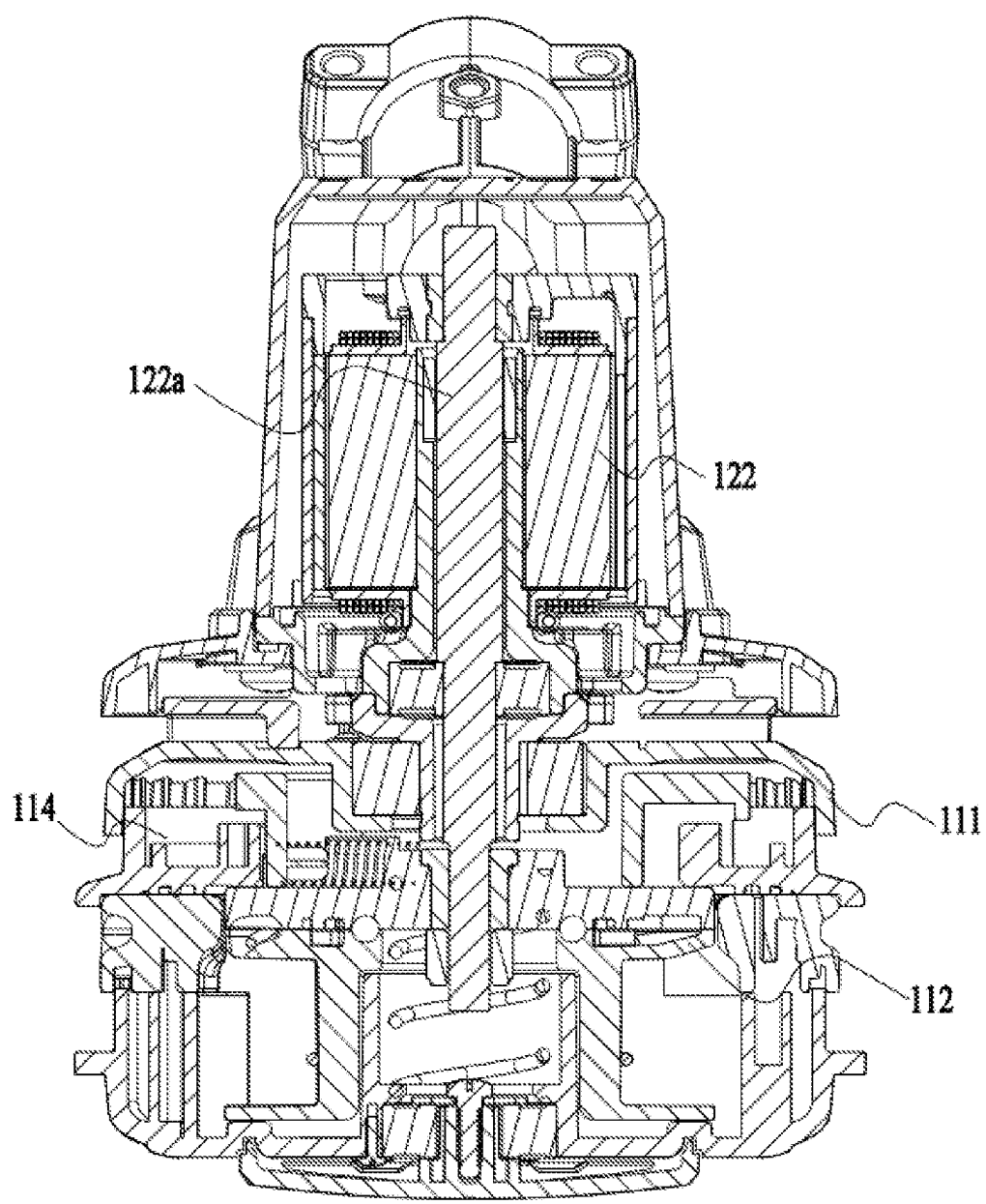
FIG. 2 is a section view of a trimmer head for the string trimmer of FIG. 1.

As shown in FIG. 1 to FIG. 2, the trimmer head 11 is used to install a trimming line 15 for the trimming function. The driving device 12 is used to provide a rotational power to the trimmer head 11. The driving device 12 includes a motor 122 and a first housing 121. The motor 122 is arranged in the first housing 121. The motor 122 drives the trimmer head 11 to rotate by a rotation axis 101. The operating device 13 includes a handle 131, an auxiliary handle 132, a main switch 133, and a second housing 134. The handle 131 and the auxiliary handle 132 are used for the users to hold by two hands respectively, so that the string trimmer 100 can be operated more stably. The main switch 133 may be provided on the handle 131, and the user can directly operate the main switch 133 to control the string trimmer 100 to trim grass when holding the handle 131. The second housing 134 is for forming a joint part that is combined with the power supply device. For example, the joint part can be combined with a battery pack to supply power to the string trimmer 100. In this example, the handle 131 and the second housing 134 are formed separately. In some other examples, the handle can also be integrally formed with the second housing. The connecting device 14 includes a connecting rod for connecting the first housing 121 and the second housing 134. The auxiliary handle 132 is also installed to the connecting rod, and the auxiliary handle 132 is also located between the first housing 121 and the second housing 134. The string trimmer 100 further includes a guard 16 which is at least partially surrounding the trimmer head 11, which in turn prevent the debris from flying to the direction where the user or operator stands when the string trimmer 11 is trimming the grass.

In order to facilitate the description of the technical solution of the present disclosure, an upper side and a lower side are defined as shown in FIG. 2, wherein the driving device 12 is arranged on the upper side of the trimmer head 11, and the trimmer head 11 is arranged on the lower side of the driving device 12.

The trimmer head 11 also includes a head housing 111, a spool 112 and a coupling device 113. The head housing 111 is formed with an accommodating space 114 around the rotation axis 101 that can accommodate at least a part of the spool 112. The side of the head housing 111 forming the accommodating space 114 is the inner side of the head housing 111, and the side of the head housing 111 opposite to the inner side is outside.

As shown in FIGS. 1 to 4, the spool 112 is disposed in the accommodating space 114. That is, the spool 112 is disposed on the inner side of the head housing 111. The spool 112 is used for winding the trimming line 15, and the trimming line 15 is used for trimming grass. The head housing 111 also form an outer threading aperture 111a for the trimming line 15 to extend to the outside of the head housing 111, and the amount of the outer threading apertures 111a is two. The spool 112 also forms an inner threading aperture 112a. When the inner threading aperture 112a and the outer threading aperture 111a are located in the same radial direction, the trimming line 15 can pass through the outer threading aperture 111a and the inner threading aperture 112a in sequence. The part of the trimming line 15 extending through the outer threading aperture 111a to the outside of the head housing 111 is defined as the effective part of the trimming line 15, and the effective part of the trimming line 15 trims weeds by high-speed rotation. In order to trim weeds within the expected area, the length of the effective part of the trimming line 15 should reach a preset value. That is, the length of the effective part of the trimming line 15 should be greater than or equal to the preset value. When the length of the effective part of the trimming line 15 is less than the preset value, the cutting efficiency of the trimming line 15 may be reduced because the effective part of the trimming line 15 is relatively short. In order to keep the length of the effective part of the trimming line 15 to be on the length range greater than or equal to the preset value, the coupling device 113 controls the trimming line 15 to be automatically fed to a length range greater than or equal to the preset value when the length of the effective part of the trimming line 15 is lower than the preset value. Exemplarily, in order to prevent the extension length of the trimming line 15 from being too long and causing interference with the guard 16, the effective part of the trimming line 15 is actually less than or equal to a limit value. Within this limit, the trimming line 15 can effectively mow the grass and maintain a high mowing efficiency; on the other hand, the trimming line 15 will not interfere with the guard 16, so that the mowing can be continued.

The coupling device 113 is used to control whether the trimmer head 11 is feeding or not. The coupling device 113 has a first equilibrium state that makes the trimmer head 11 unable to feed. At this time, the trimming head 11 is in working state. The coupling device 113 also has a second equilibrium state where the trimmer head 11 can feed the line, and the trimmer head 11 is in a line-out state at this time. In this example, the coupling device 113 can automatically identify the effective length of the trimming line 15 and can automatically adjust the trimmer head 11 to enter the first equilibrium state or the second equilibrium state according to the length of the effective part of the trimming line 15. In one example, the coupling device 113 automatically recognizes and adjusts the working mode of the trimmer head 11 based on the coupling device 113 itself, and it does not need to accept an input from an outside or an indication signal for feeding the line or trimming. The indication signal mentioned here includes a signal that causes the coupling device 113 to switch modes due to an external force, electrical signal, magnetic force, or other force generated by the outside on the trimmer head 11. In some common indication signals, it generally includes: tapping the shell of the trimmer head 11 to make the spool 112 and the head housing 111 produce a speed difference to feed the line; adjusting the speed through a switch to make the spool 112 and the head housing 111 to produce a speed difference to feed the line; inducting the current change through a sensor induces in the motor to cause a speed difference between the spool 112 and the head housing 111 to feed the line. In addition, the trimmer head 11 in this example has a constant rotation speed, and it does not need to change the rotation speed to obtain the speed difference between the head housing 111 and the spool 112 to perform line feeding.

Exemplarily, when the coupling device 113 is in the first equilibrium state, the spool 112 and the head housing 111 are relatively static. In this way, the spool 112 and the head housing 111 will be driven by a motor shaft 122*a* to rotate synchronously, so that at this time the length of the trimming line 15 wound on the spool 112 extending from the effective part of the head housing 111 will not change. That is, the trimming line 15 cannot be released, and the trimmer head 11 is in a normal working state at this time. When the coupling device 113 is in the second equilibrium state, a relative movement occurs between the spool 112 and the head housing 111. In this way, the trimming line 15 is thrown out relative to the spool 112 under the action of its own centrifugal force, so that the trimming line 15 is released, and the length of the effective part of the trimming line 15 will increase.

Figure 3:
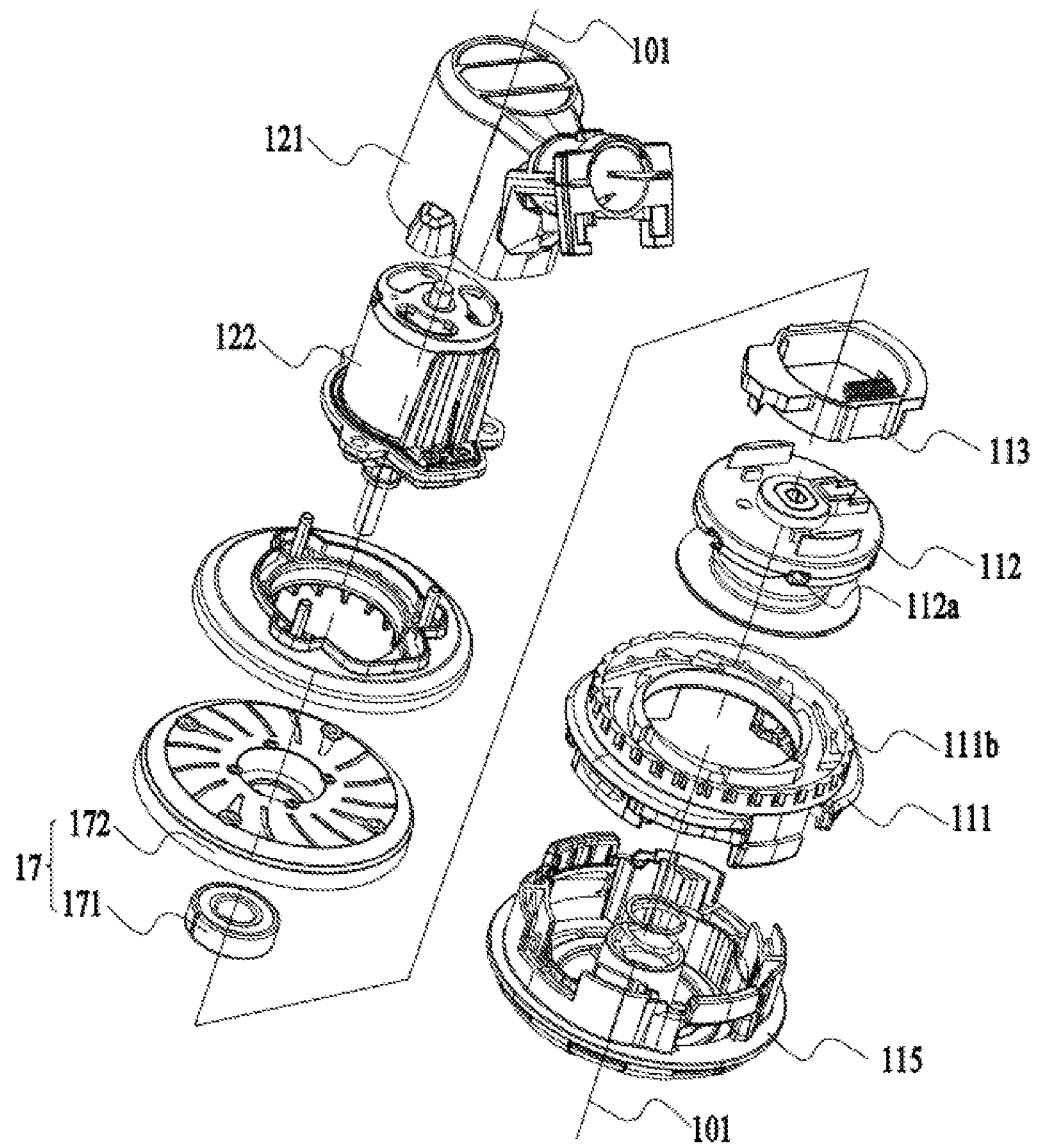
FIG. 3 is an explosion view of the trimmer head for the string trimmer of FIG. 1.
Figure 4:
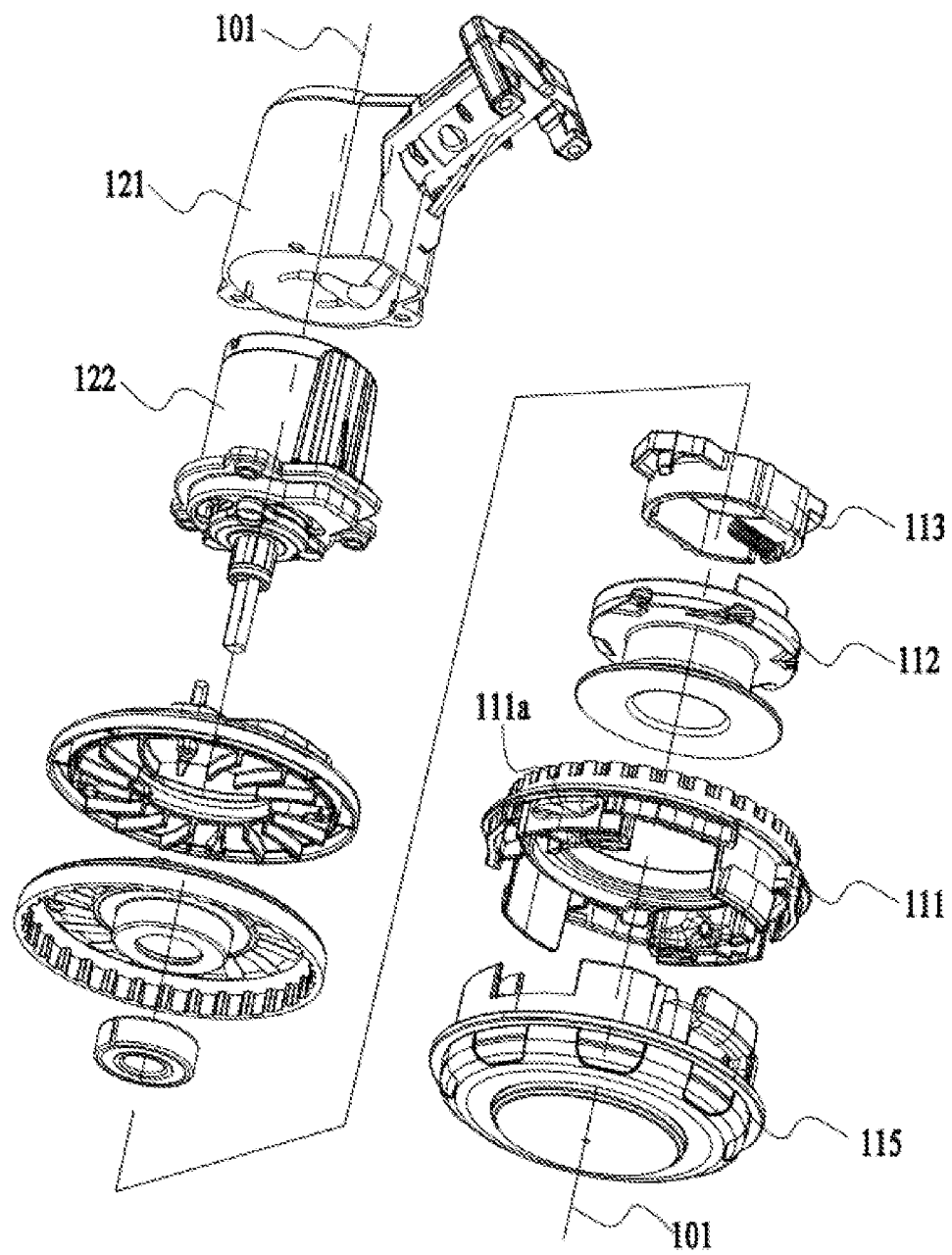
FIG. 4 is an explosion view of the trimmer head for the string trimmer on another view.
Figure 5:
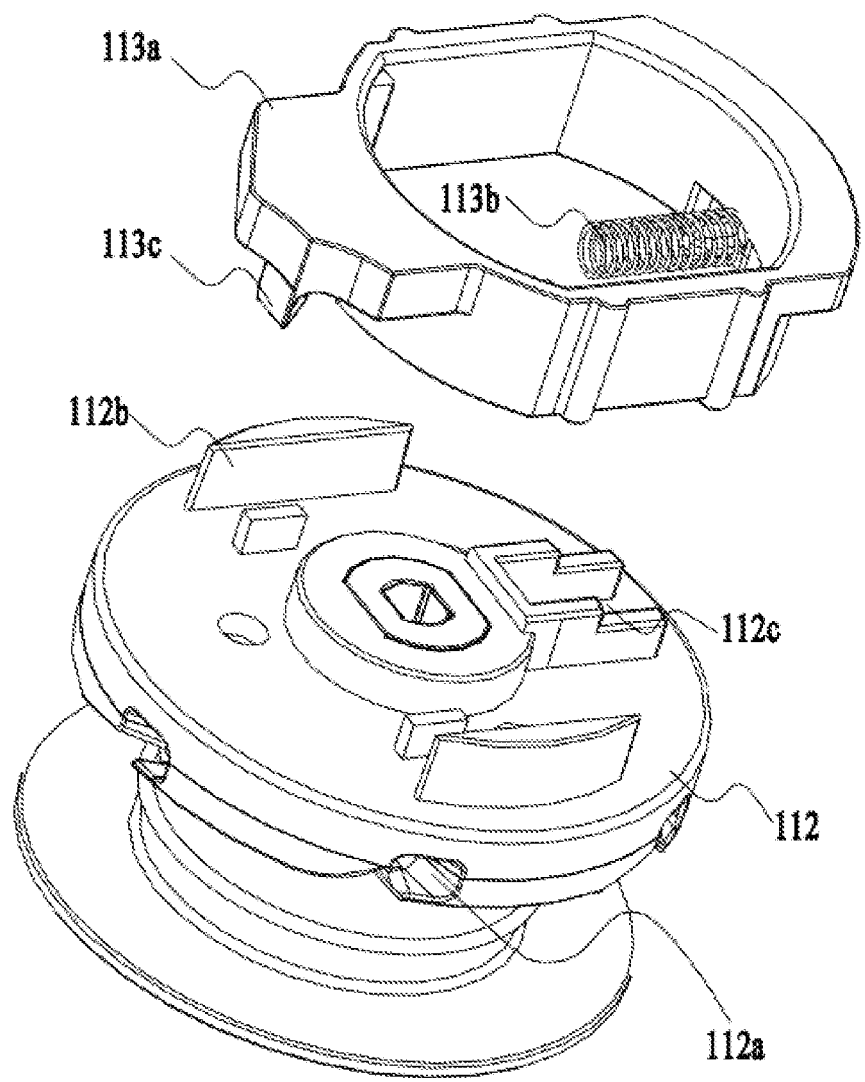
FIG. 5 is a perspective view of a spool and a transmission member of the string trimmer of FIG. 3.
Figure 6:
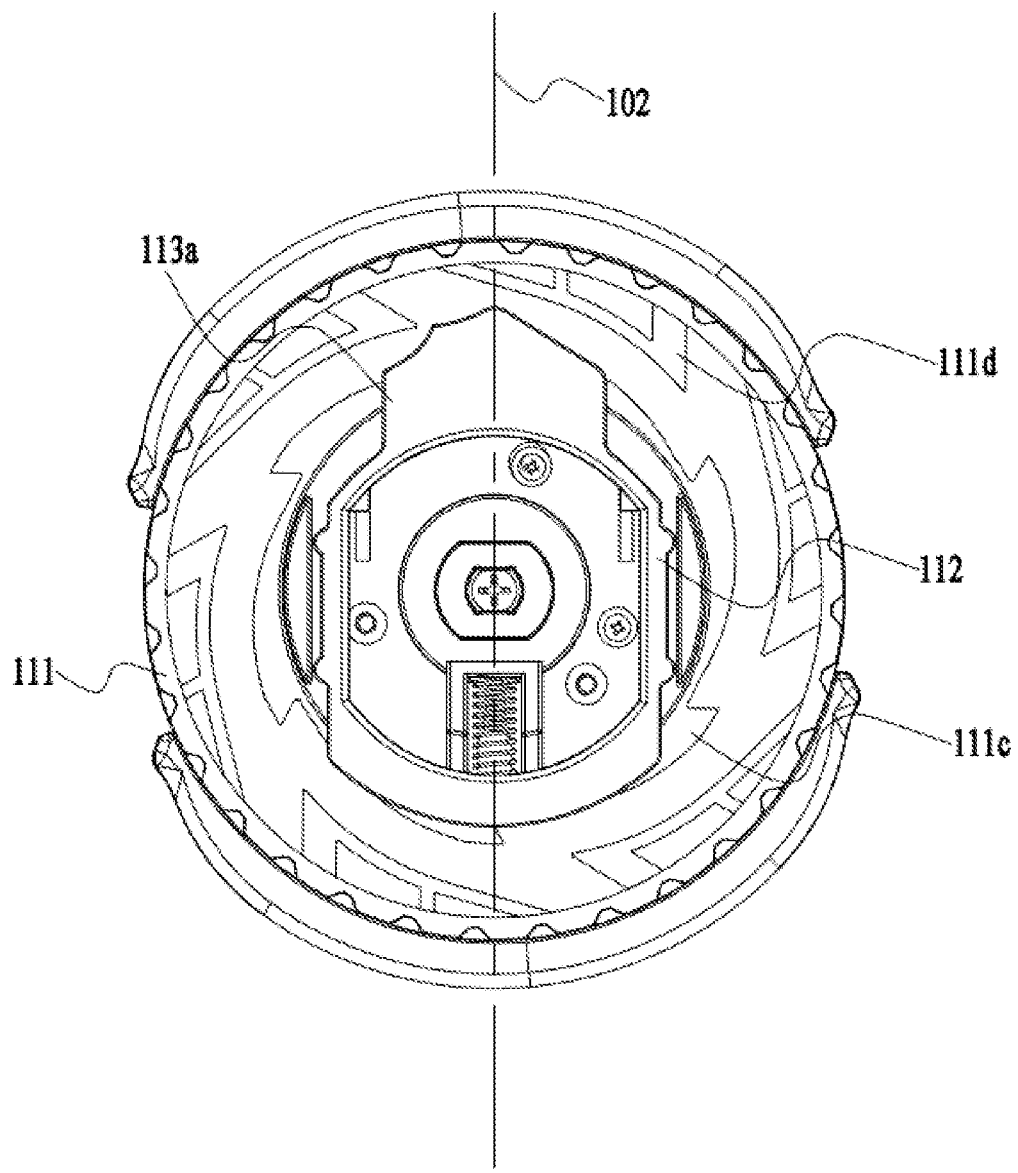
FIG. 6 is a top view of a head housing, the spool, and the transmission member of the string trimmer of FIG. 3.

As shown in FIGS. 3 to 4, in some examples, the coupling device 113 includes a transmission member 113*a* that can move freely between the spool 112 and the head housing 111. When the coupling device 113 is in the first equilibrium state, the transmission member 113*a* rotates synchronously with the spool 112, and the transmission member 113*a* also mates with the head housing 111 to drive the head housing 111 to rotate synchronously with the spool 112. When the coupling device 113 is in the second equilibrium state, the transmission member 113*a* rotates with the spool 112, and at the same time, the transmission member 113*a* is disengaged from the head housing 111. At this time, the spool 112 and the head housing 111 can move relative to each other.

Exemplarily, in the direction of a first straight line 102 which is substantially perpendicular to the direction of the rotation axis 101 or obliquely intersecting the rotation axis 101, the transmission member 113*a* is arranged between the spool 112 and the head housing 111 along the direction of the first straight line 102. The motor shaft 122*a* and the spool 112 rotate synchronously. The transmission member 113*a* is provided with a transmission aperture through which the spool 112 is sleeved and can rotate synchronously with the spool 112. In this way, when the motor shaft 122*a* drives the spool 112 to rotate, the transmission member 113*a* can rotate with the spool 112 synchronously. In fact, a limiting portion 112*b* is formed or coupled to the spool 112, and the limiting portion 112*b* can limit the displacement of the transmission member around the circumference of the rotation axis 101. Optionally, the limiting portion 112*b* is a pair of protrusions symmetrically arranged with respect to a symmetry plane passing through the first straight line 102. When the transmission member 113*a* is sleeved to the spool 112 in the direction of the rotation axis 101, it can be limited to the limiting portion 112*b*, and can only produce radial displacement in the linear direction perpendicular to the rotation axis 101. The transmission member 113*a* is asymmetrical with respect to the symmetry plane passing through the rotation axis 101 in terms of mass distribution. Optionally, a center of gravity G of the transmission member 113*a* deviates from the symmetry plane. A biasing element 113*b* is also provided between the transmission member 113*a* and the spool 112, and the biasing element 113*b* can be a coil spring.

Optionally, a receiving groove 112*c* is formed extending on the spool 112, and the coil spring is at least partially disposed in the receiving groove 112*c*. One end of the coil spring abuts against the bottom of the receiving groove 112*c*, and the other end abuts the transmission member 113*a*. The center of gravity of the transmission member 113*a* and the coil spring are arranged on two sides of the rotation axis 101. In addition, the limiting portion 112*b* and the receiving groove 112*c* mate to form a sliding rail for the transmission member 113*a* to slide. That is, the transmission member 113*a* also forms a sliding connection with the spool 112.

When the transmission member 113*a* rotates with the spool 112, the transmission member 113*a* will generate a centrifugal force, and the transmission member 113*a* is also subjected to a biasing force of the biasing element 113*b*. The direction of the biasing force and the centrifugal force are opposite. The directions of the centrifugal force and the biasing force can both be in the direction of the first straight line 102. The direction in which the transmission member 113*a* and the spool 112 constituting the sliding may also be along the direction of the first straight line 102. The center of gravity of the transmission member 113*a* and the biasing element 113*b* are respectively arranged on two sides of a plane passing through the rotation axis 101 and perpendicular to the first straight line 102. Exemplarily, when the transmission member 113*a* moves in the direction of the first straight line 102 relative to the spool 112, it is also affected by a friction force between the transmission member 113*a* and the spool 112. The friction force can effectively prevent the biasing element 113*b* from overcoming the centrifugal force and prevent the coupling device 113 from being overly flexible and causing the misfeeding of the line.

Figure 7:
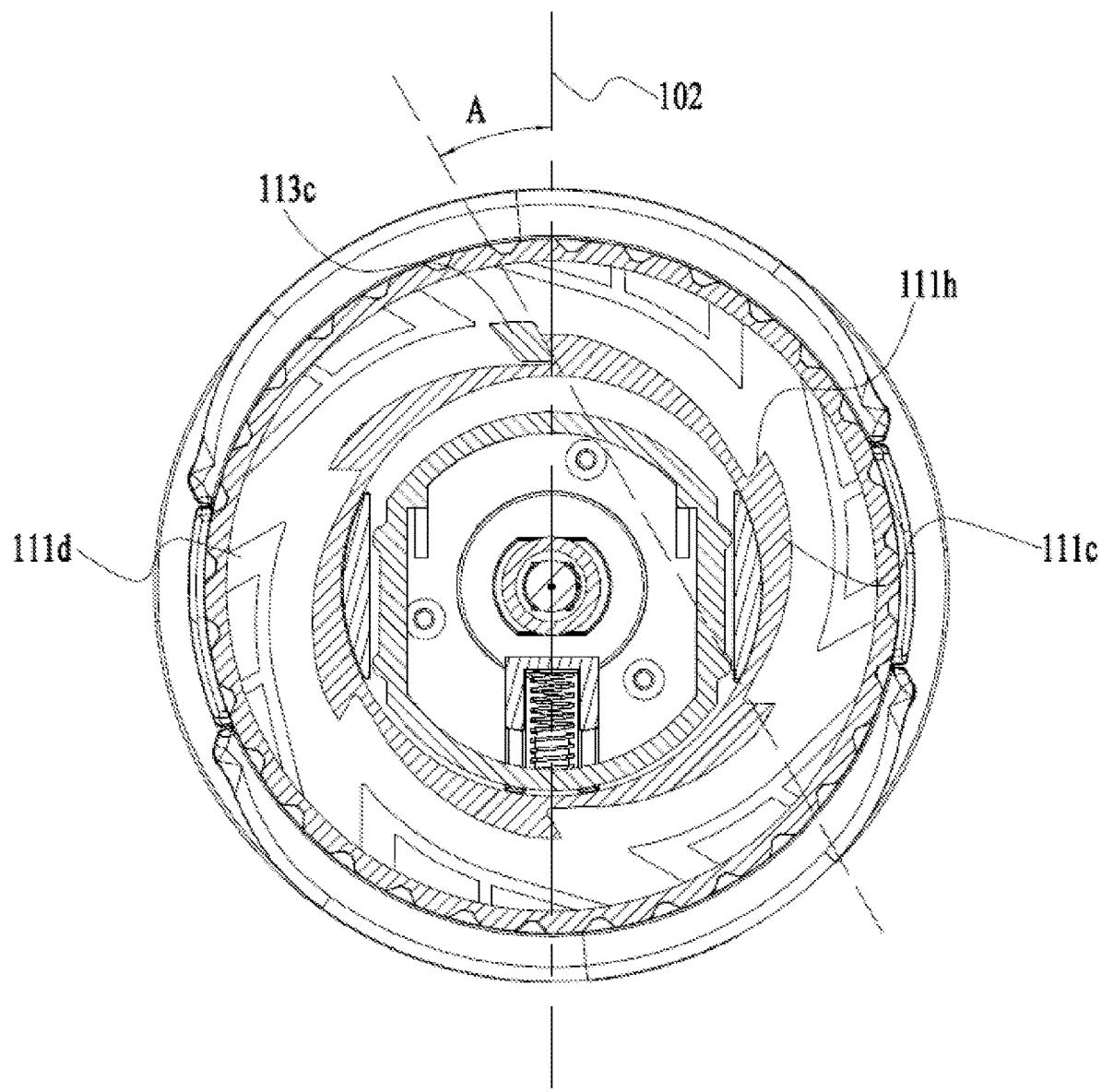
FIG. 7 is a section view of the head housing, the spool, and the transmission member of the string trimmer of FIG. 3.
Figure 8:
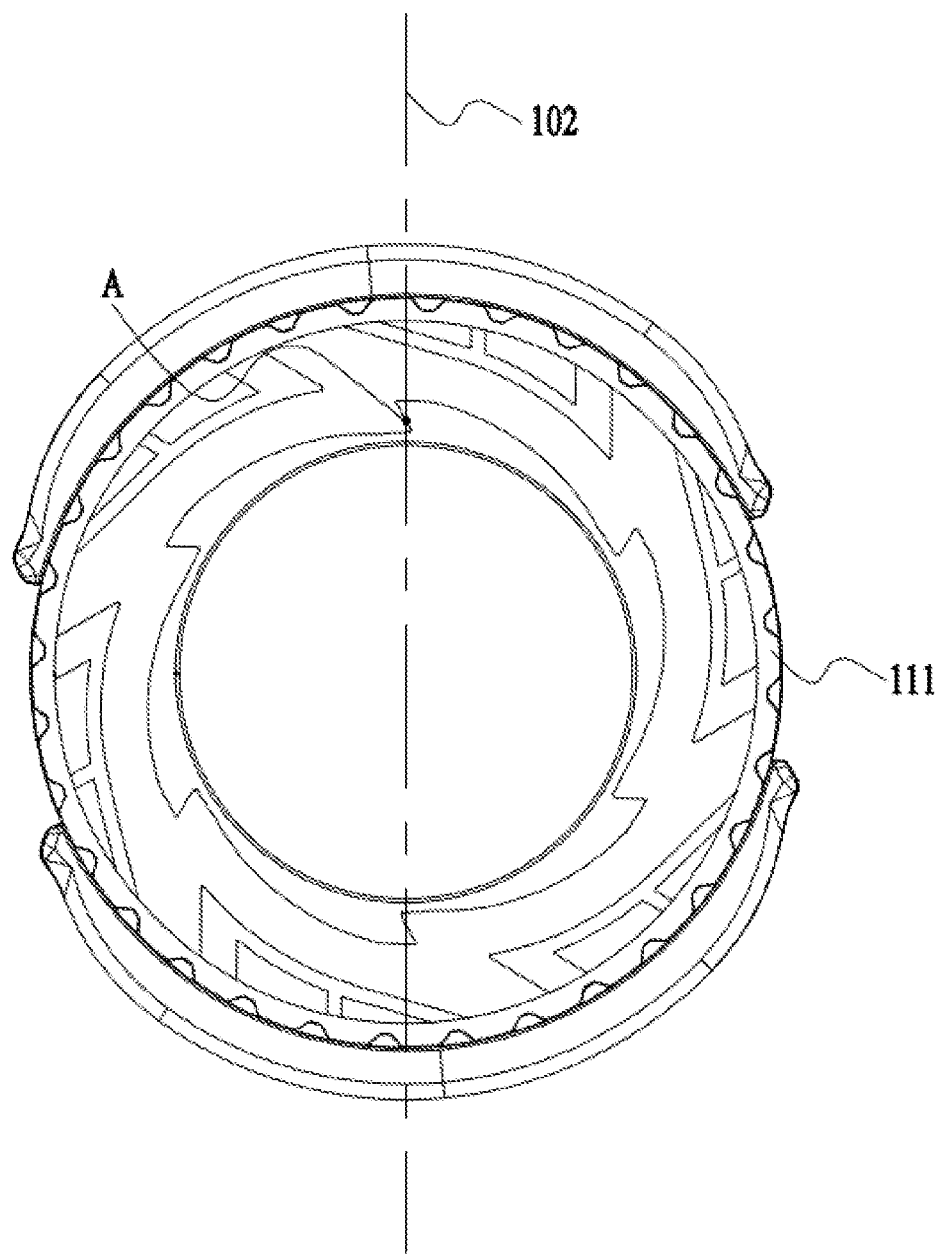
FIG. 8 is a top view of the head housing of the string trimmer of FIG. 3.
Figure 9:
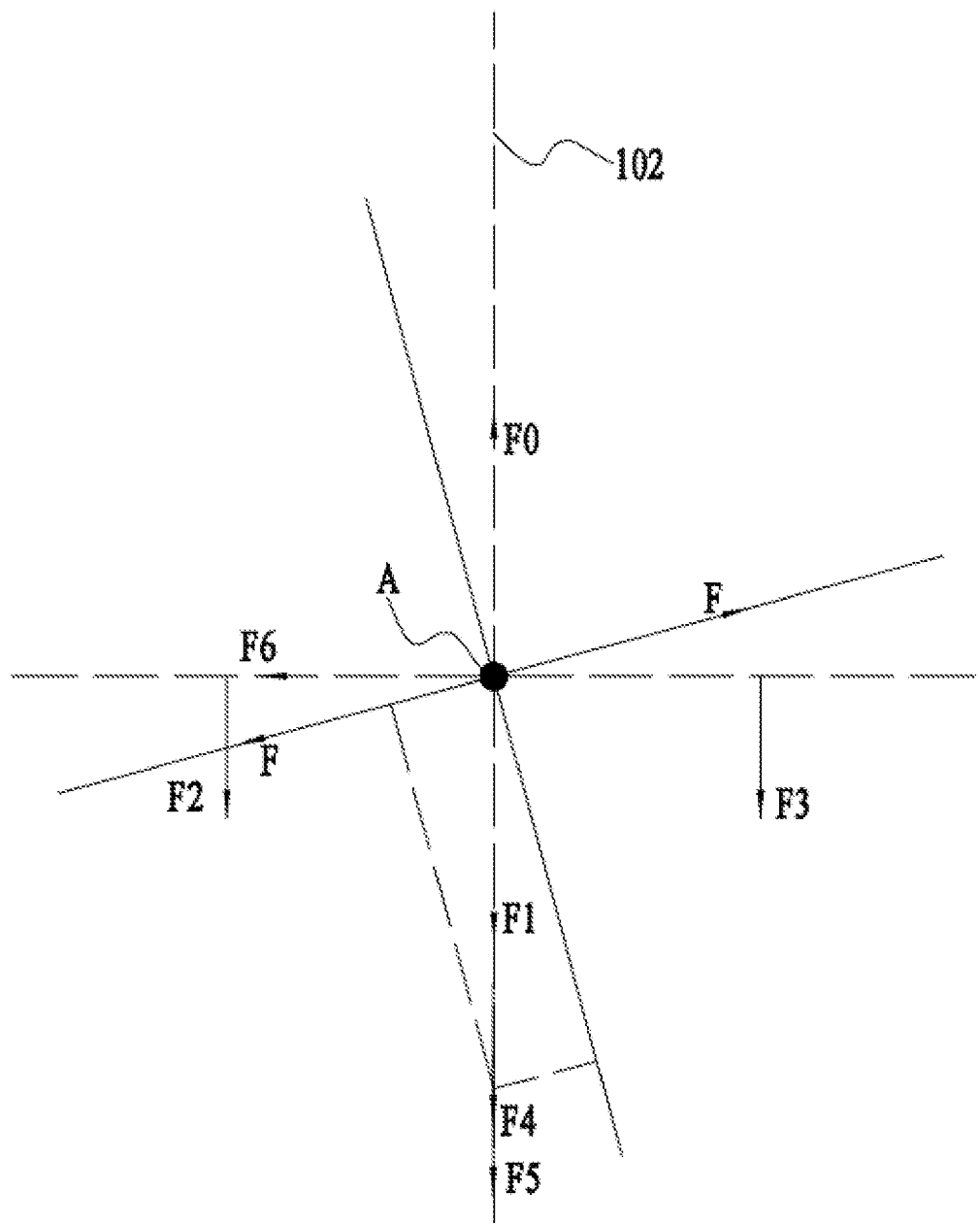
FIG. 9 is a force analysis diagram for any point on a first teeth of the working head of the string trimmer of FIG. 8.
Figure 10:
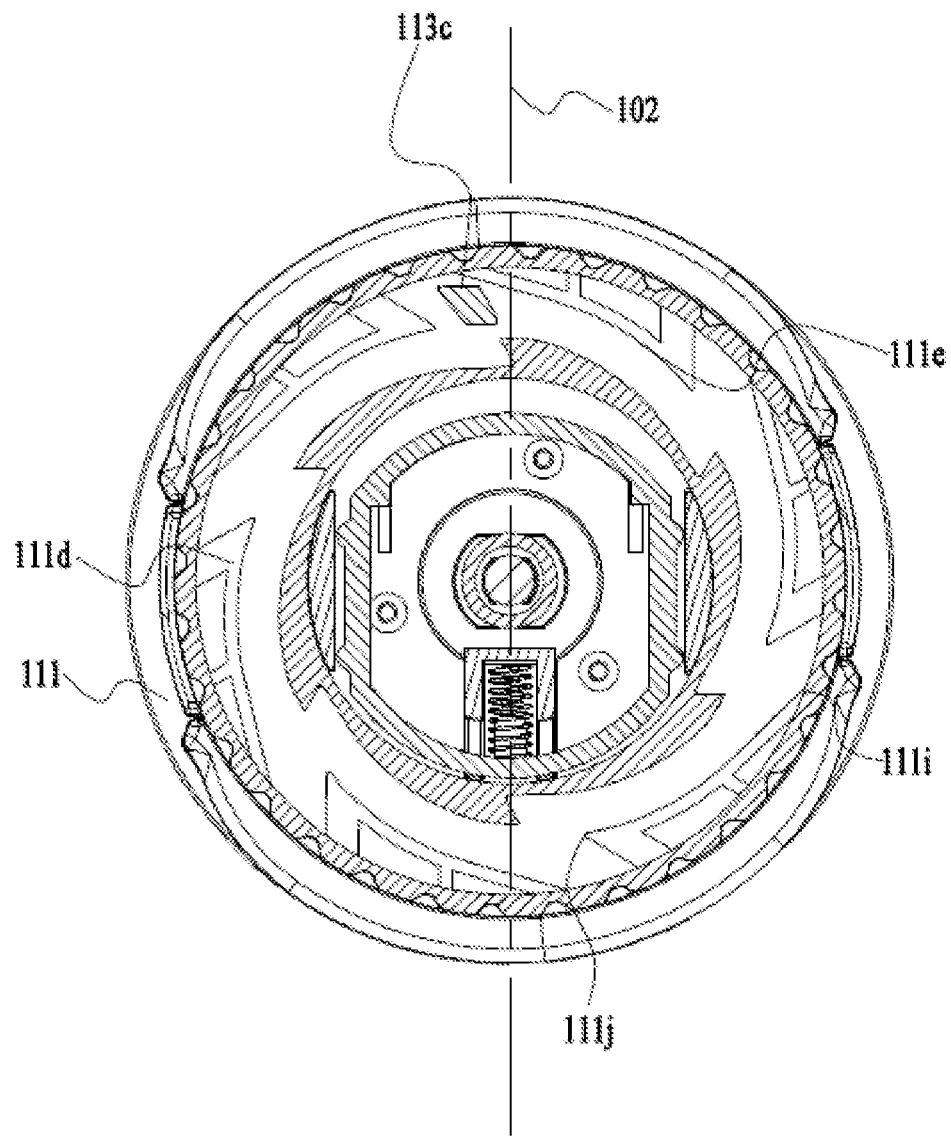
FIG. 10 is a section view of the working head, the spool, and the transmission member of the string trimmer of FIG. 3 when the transmission member is between a first inner tooth and a second inner tooth.
Figure 11:
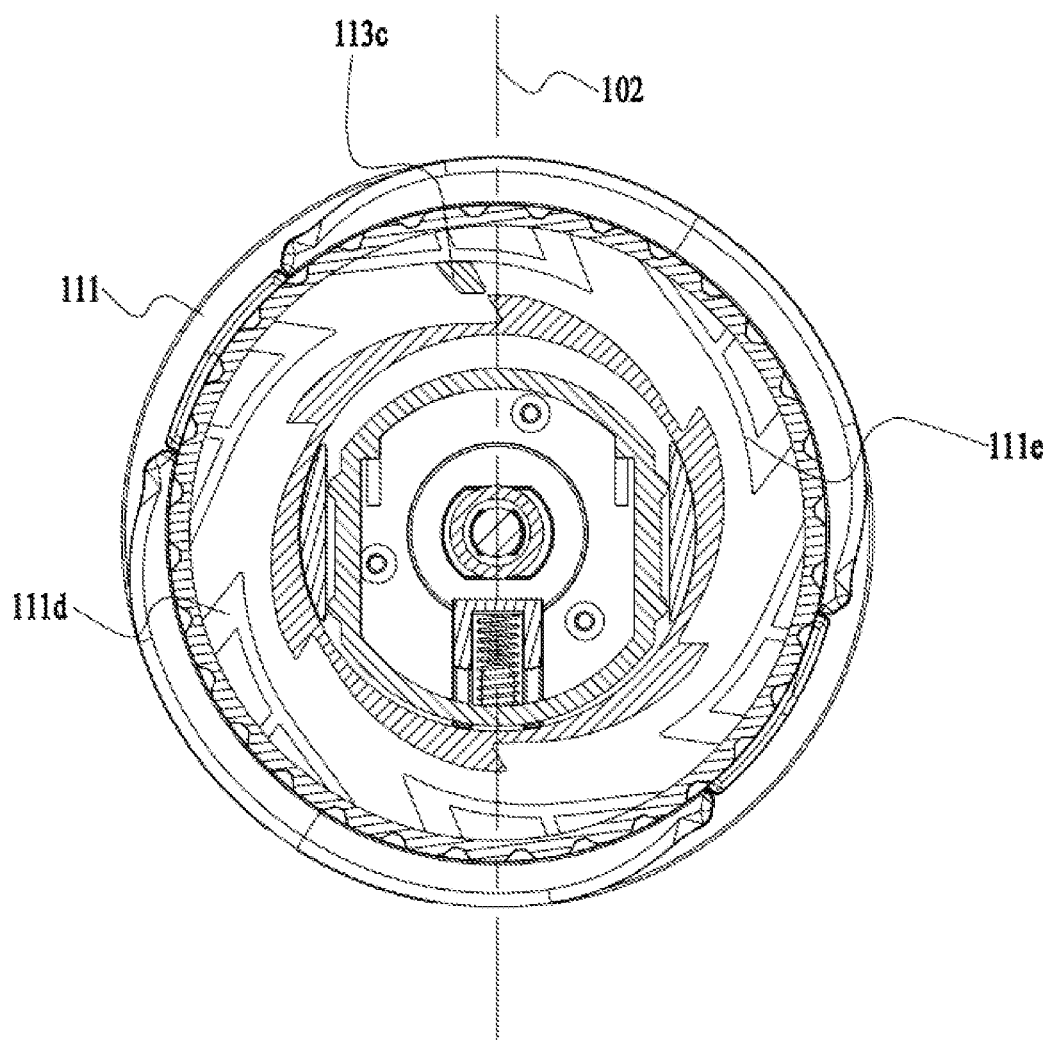
FIG. 11 is a section view of the trimmer head, the spool, and the transmission member of the string trimmer of FIG. 3 when the transmission member is pushed back by the second inner tooth.

As shown in FIGS. 3 to 4, in the present example, the head housing 111 forms the accommodation space 114 mentioned above around the rotation axis 101, the spool 112 is at least partially disposed in the accommodation space 114 formed by the head housing 111, and the transmission member 113*a* is at least partially located in the accommodating space 11. Exemplarily, an upper bottom 111*b* is formed on the end of the head housing 111 near the motor 122 in the direction of the rotation axis 101. The upper bottom 111*b* does not enclose the accommodating space 114, and the accommodating space 114 is partially opened upward, so that the motor shaft 122*a* passes through the upper bottom 111*b* and extends into the accommodation space 114, and the transmission member 113*a* partially protrudes out of the head housing 111. The head housing 111 also forms a mating portion that can be driven by the transmission member 1113*a*. As shown in FIGS. 7 to 9, an inner ring and an outer ring are formed in the direction where the upper bottom 111*b* extends toward the motor 122. Both the inner ring and the outer ring are formed around the rotation axis 101. The inner ring is formed with a first teeth 111*c*, and the first teeth 111*c* are external teeth formed on the inner ring and protruding toward the outer ring. The outer ring is formed with a second teeth 111*d*, and the second teeth 111*d* are internal teeth formed on the outer ring and protruding toward the inner ring. The first teeth 111*c* and the second teeth 111*d* are the aforementioned mating portion. The number of the first teeth 111*c* is multiple, and the number of the second teeth 111*d* is also multiple. In the circumferential direction around the rotation axis 101, the first teeth 111*c* and the second teeth 111*d* are staggered from each other. That is, the first teeth 111*c* and the second teeth 111*d* are not arranged in a diameter direction perpendicular to the rotation axis 101 at the same time. The transmission member 113*a* is formed with a driving portion 113*c* that can mate with first teeth 111*c* or second teeth 111*d*. The driving portion 113*c* can be configured as a biting tooth. At this time, the first teeth 111*c* and the second teeth 111*d* are used for receiving the mating portion of the biting tooth. In this example, the driving portion 113*c* and the biasing element 113*b* are arranged on two sides of the transmission member 113*a* respectively. That is, the center of gravity of the driving portion 113*c* and the transmission member 113*a* are arranged on the same side of the rotation axis 101. As shown in the figure, when the driving portion 113*c* of the transmission member 113*a* is engaged with the first teeth 111*c* or the second teeth 111*d* and the motor shaft 122a rotates in the first rotation direction, that is, when the motor shaft 122a rotates clockwise, the transmission member 113a makes the head housing 111 to be relative static to the spool 112, that is, there is no relative movement between the spool 112 and the head housing 111 at this time. It can be considered that the coupling device 113 is in the first equilibrium state at this time, and the string trimmer 100 is in the working state of normal grass trimming. As shown in FIG. 10, when the driving portion 113c of the transmission member 113a is separated from the first teeth 111c and the second teeth 111d, a whole composed of the transmission member 113a and the spool 112 can move relative to the head housing 111. In this example, the direction of the movement of the spool 112 relative to the head housing 111 is consistent with the direction in which the string trimmer 100 trims grass. That is, the direction of the movement of the spool 112 relative to the head housing 111 is clockwise, the spool 112 can now produce a relative movement relative to the head housing 111, it can be considered that the coupling device 113 at this time is in the second equilibrium state, and the trimmer head 11 is in the line-feeding state.

As shown in FIG. 7, each of the first teeth 111c includes a tooth surface 111h, and the tooth surface 111h of the first teeth 111c obliquely intersects the first straight line 102 and forms a preset angle. The first teeth 111c incline toward the first rotation direction. In some examples, the angle A between the tooth surface 111h of the first teeth 111c and the first straight line 102 is greater than 0° and less than or equal to 45°. During the grass trimming process of the string trimmer 100, the trimmer head 11 always keeps rotating at a constant speed. When the transmission member 113a rotates with the spool 112 at the constant speed, there will be an interaction force F between the transmission member 113a and the mating portion of the head housing 111. The force F is distributed along a direction perpendicular to the tooth surface 111h of the first teeth 111c. However, during the rotation of the trimmer head 11, due to the change in the length of the trimming line 15, the torque outputted by the trimmer head 11 also changes accordingly. Exemplarily, the longer the trimming line 15 is, the greater the torque outputted by the trimmer head 11 will be, and the greater the interaction force between the transmission member 113a and the head housing 111 will be. On the contrary, the shorter the trimming line 15 is, the smaller the torque outputted by the head 11 will be, and the smaller the interaction force between the transmission member 113a and the head housing 111 will be.

Any point on the tooth surface 111h of the first teeth 111c can be used for force analysis. As shown in FIG. 9, the interaction force F between the first teeth 111c of the head housing 111 and the driving portion 113c of the transmission member 113a is distributed along a direction perpendicular to the tooth surface 111h of the first teeth 111c, which can be decomposed into a first component force in the direction of the first straight line 102 and a second component force F1 in the direction of the first straight line 102, wherein the direction of the second component force F1 is opposite to the direction of the centrifugal force F0. In addition, a friction is generated between the transmission member 113a and the spool 112 due to the centrifugal force F0, and the friction is actually generated when the transmission member 113a slides in the sliding rail formed by the limiting portion 112b and the receiving groove 112c. Since the sliding rail is distributed symmetrically with respect to a plane passing through the first straight line 102 and the rotation axis 101 at the same time, that is, in the direction of a straight line perpendicular to the rotation axis 101, the transmission member 113a and the limiting portion 112b include at least two contact surfaces. Therefore, the friction force includes F2 and F3, and F2 and F3 form a resultant force F4 distributed along the direction of the first straight line 102. In addition, the biasing force between the transmission member 113a and the biasing element 113b can be defined as F5, and F1, F4, F5 are all distributed along the direction of the first straight line 102 and deviate from the centrifugal force F0. In this example, F0 is only related to the mass of the transmission member 113a, the angular velocity of the trimmer head 11, and the radius of the spool 112. That is, when the aforementioned parameters are all fixed values, F0 is a constant. F5 is the biasing force between the transmission member 113a and the biasing element 113b. When the elastic coefficient of the biasing element 113b is determined, F5 is also a constant. Therefore, during the rotation of the trimmer head 11, when the load of the trimmer head 11 changes due to the change in the length of the trimming line 15, only F changes, that is, F1 changes. F4 is a sliding friction force between transmission member 113a and the spool 112. When the material and contacting area of the transmission member 113a and the spool 112 are determined, F4 changes synchronously with F1. Therefore, when the trimming line 15 is greater than a preset length, the torque of the trimmer head 11 is relative large at this time, resulting in a large F1, so that F0<F1+F4+F5, that is, the centrifugal force at this time is less than the summation of F1, F4 and F5. The transmission member 113a cannot be separated from the first teeth 111c under the action of centrifugal force, and the entire trimmer head 11 is in the first equilibrium state. When the trimming line 15 is less than a preset length, the torque of the trimmer head 11 is smaller at this time, resulting in a smaller F1, so that F0>F1+F4+F5, that is, the centrifugal force at this time is greater than the summation of F1, F4 and F5. The transmission member 113a is separated from the first teeth 111c under the action of centrifugal force, and the entire trimmer head 11 is in the second equilibrium state. At this time, the spool 112 can rotate relative to the head housing 111, and the trimmer head 11 starts to feed the line.

In one example, the angle between the tooth surface 111h of the first teeth 111c and the direction of the first straight line 102 is 18°. When the length of the effective part of the trimming line 15 is greater than a preset value, the torque at the output end of the motor is 0.505 N·m. At this time, the mechanics calculation is carried out according to the principle of force reaction:

$$T=F*R \tag{1}$$

Where T represents the torque at the output end of the motor, F represents the interaction force between the spool 112 and the transmission member 113a on a tooth surface perpendicular to the first teeth 111c, and R represents a force radius of an action point on the tooth surface.

It is deduced that when the length of the effective part of the trimming line 15 is greater than the preset value, the force of the transmission member 113a is as follows:

$$F=T/R=0.505/37.5*1000=13.47N \tag{2}$$

$$F1=F*\sin 18=13.47*\sin 18=4.16\,N \tag{3}$$

$$F4=F*k=13.47*0.25=3.37N \tag{4}$$

$$F5=3N \tag{5}$$

$$F0=mw^2*r=0.0167*607.37*607.37*0.0014=8.62N \tag{6}$$

It can be concluded that when the length of the effective part of the trimming line 15 is greater than the preset value, the relationship between the centrifugal force received by the transmission member 113a and other resultant forces is 8.62<4.16+3.37+3=10.53. That is F0<F1+F4+F5. Therefore, at this time, the centrifugal force received by the transmission member 113a is smaller than the resultant force which driving the transmission member 113a toward the driving portion 113c to engage with the first teeth 111c on the head housing 111, and the transmission member 113a keeps engaging with the head housing 111 when receiving the resultant force of all the forces.

When the effective part of the trimming line 15 is worn and shortened by 40 mm, the torque at the output end of the motor is 0.265 N·m. At this time, it is deduced that when the length of the effective part of the trimming line 15 is worn to less than the preset value, the force of the transmission member is as follows:

$$F = T/R = 0.24/37.5*1000 = 7.07N \quad (7)$$

$$F1 = F*\sin 18 = 7.07*\sin 18 = 2.18\ N \quad (8)$$

$$F4 = F*k = 7.07*0.25 = 1.77N \quad (9)$$

$$F5 = 3N \quad (10)$$

$$F0 = mw^2*r = 0.0167*607.37*607.37*0.0014 = 8.62N \quad (11)$$

It can be concluded that when the length of the effective part of the trimming line 15 is less than the preset value, the relationship between the centrifugal force received by the transmission member 113a and other resultant forces is 8.62>2.18+1.77+3=6.95. That is F0>F1+F4+F5. Therefore, at this time, the centrifugal force received by the transmission member 113a is greater than the resultant force of the engagement between the driving portion 113c which drives the transmission member 113a and the first teeth 111c on the head housing 111. Therefore, the transmission member 113a is under the resultant force of all the forces received and moves along the direction of the first straight line to separate from the head housing 111, so that the transmission member 113a allows the head housing 111 and the spool 112 to rotate relative to each other at this time, and then the trimming line 15 can be released at this time.

The mechanical calculation process shown above is only to facilitate the understanding of the force relationship between the spool 112, the head housing 111, and the transmission member 113a when the trimmer head 11 is in the first equilibrium state and the string trimmer 11 rotates is at a constant speed. During use, the above data will have a preset deviation, which does not limit the protection scope of the present disclosure in other examples. As shown in FIG. 10, when the trimmer head 11 is in the second equilibrium state, the transmission member 113a is not constrained by the first teeth 111c and the second teeth 111d and can continue to follow the direction of the first straight line 102 under the action of centrifugal force and move toward the second teeth 111d. When the driving portion 113c of the transmission member 113a moves to the second teeth 111d of the head housing 111, a return surface 111e is also formed on the second teeth 111d. During the rotation of the return surface 111e between the head housing 111 and the spool 112, the transmission member 113a can be pushed to move along the first straight line 102 toward the first teeth 111c, and finally engaged with the first teeth 111c, so as to complete a line feeding and enter the next automatic identification. In this example, the second teeth 111d are not uniformly distributed in the circumferential direction around the rotation axis 101. The return surface 111e have a substantially continuous smooth surface to continuously push the transmission member 113a back to the first teeth 111c and engage with the first teeth 111c. The return surface 111e includes a first end 111i and a second end 111j, the second end 111j is closer to the rotation axis 101 relative to the first end 111j, and the second end 111j and the first end 111i are arranged in different radial directions, so that the return surface 111e is capable of pushing the transmission member 113a to reset.

In fact, when turning on the tool, when the trimmer head 11 accelerates from a static state to a constant speed state, if the trimming line 15 is greater than a preset length, the trimming line 15 will not be released due to the speed change; if the trimming line 15 is less than a preset length, the trimming line 15 will be released to a length greater than the preset length as the speed changes. The release of the trimming line 15 is not related to the speed change. It is only because the trimming line 15 is relative short and the torque at the output end of the motor is relative small, so that the trimming line 15 is released.

What is claimed is:

1. A string trimmer, comprising:
    a trimmer head comprising:
        a spool for winding a trimming line, the spool comprising an outer surface having a limiting portion extending upwards from the outer surface, the limiting portion defining a channel;
        a head housing defining an accommodating space for at least partially accommodating the spool, the head housing comprising an outer housing surface defining an aperture though which the limiting portion extends, a circumference of the aperture including a plurality of mating portions extending from the outer housing surface, the plurality of mating portions each having an inclined surface and a plane defined by the inclined surface;
        a transmission member slidably coupled to the spool within the channel, the transmission member comprising a driving portion, the transmission member having a first position where the driving portion mates with at least one of the plurality of mating portions of the head housing to prevent relative rotation between the spool and the head housing and a second position where the driving portion does not mate with at least one of the plurality of mating portions of the head housing to allow relative rotation between the spool and the head housing;
        a biasing element for biasing the transmission member towards the first position; and
        a driving device comprising a motor for driving the trimmer head to rotate around a rotation axis;
    wherein the driving portion drives the head housing to rotate synchronously with the spool, the head housing is formed with a mating portion to mate with the driving portion, the mating portion comprises a first teeth distributed around the rotation axis, each of the first teeth comprises a tooth surface, and when the trimmer head rotates around the rotation axis and the transmission member rotates with the spool around the rotation axis, the transmission member generates a centrifugal force along a first straight line, the inclined surface contacts the driving portion and imparts an acting force to the driving portion, the acting force has a first component force along a direction perpendicular to the first straight line and a second component force along the first straight line, and the second component force is also opposite to the direction of the centrifugal force so as to prevent the transmission member from moving in the first straight line, and the trimming line has an effective portion located outside the head housing, and the second component force changes with a length of the effective portion of the trimming line, when the trimmer head switches from a working state to a line-feeding state, a rotational speed of the trimmer head does not change, and when the trimmer head switches from the working state to the line-feeding state, the trimmer head does not need an indication signal for feeding the trimming line.

2. The string trimmer according to claim 1, wherein the length of the effective portion is greater than a preset value, the second component force is increased to fix the transmission member relative to the spool and the trimmer head is in a working state, and when the length of the effective portion is less than the preset value, the second component force is reduced to allow the transmission member to slide relative to the spool and the trimmer head is in a line-feeding state.

3. The string trimmer according to claim 2, wherein the trimmer head rotates in constant speed when the trimmer head is in the working state and the line-feeding state.

4. The string trimmer according to claim 1, wherein the head housing is formed with an outer threading aperture for inserting the trimming line into the spool, the spool is formed with an inner threading aperture that mates with the outer threading aperture, and when the inner threading aperture and the outer threading aperture are located in a same radial direction, the trimming line is capable of passing through the outer threading aperture and the inner threading aperture in sequence.

5. The string trimmer according to claim 1, wherein the transmission member is sleeved on the spool through the aperture and is capable of rotating with the spool synchronously.

6. The string trimmer according to claim 1, wherein the limiting portion is capable of limiting a displacement of the transmission member around a circumference of the rotation axis.

7. The string trimmer according to claim 1, wherein when the length of the effective portion is less than a preset value, the transmission member slides along the first straight line so that the driving portion is separated from the first teeth and the head housing is formed or coupled with a second teeth capable of driving the transmission member to reset.

8. The string trimmer according to claim 7, wherein the first teeth and the second teeth are staggered around the rotation axis.

9. The string trimmer according to claim 7, wherein each of the second teeth comprises a first end and a second end, the second end is closer to the rotation axis relative to the first end, and the second end and the first end are arranged in different radial directions so that a return surface is capable of pushing the transmission member to reset.

10. The string trimmer according to claim 1, wherein when the trimmer head is driven by the motor to rotate around the rotation axis, the transmission member has a friction force relative to the spool in the first straight line perpendicular to the rotation axis and the direction of the friction force is opposite to the direction of the centrifugal force generated by the transmission member.

11. A trimmer head, capable of being driven to rotate around a rotation axis, comprising:

a spool for winding a trimming line, the spool comprising an outer surface having a limiting portion extending upwards from the outer surface, the limiting portion defining a channel;

a head housing defining an accommodating space for at least partially accommodating the spool, the head housing comprising an outer housing surface defining an aperture though which the limiting portion extends, a circumference of the aperture including a plurality of mating portions extending from the outer housing surface, the plurality of mating portions each having an inclined surface and a plane defined by the inclined surface; and a transmission member slidably coupled to the spool within the channel, the transmission member comprising a driving portion, the transmission member having a first position where the driving portion mates with at least one of the plurality of mating portions of the head housing to prevent relative rotation between the spool and the head housing and a second position where the driving portion does not mate with at least one of the plurality of mating portions of the head housing to allow relative rotation between the spool and the head housing;

wherein the head housing is formed with a mating portion to mate with the driving portion and when the trimmer head rotates around the rotation axis and the transmission member rotates with the spool around the rotation axis, the transmission member generates a centrifugal force along a straight line, the mating portion contacts the driving portion and imparts an acting force to the driving portion, the acting force has a first component force along a direction perpendicular to the straight line and a second component force along the straight line, and the second component force is also opposite to the direction of the centrifugal force so as to prevent the transmission member from moving in the straight line, and the trimming line has an effective portion located outside the head housing, and the second component force changes with a length of the effective portion of the trimming line.

12. The trimmer head according to claim 11, wherein when the length of the effective portion is greater than a preset value, the second component force is increased to fix the transmission member relative to the spool and the trimmer head is in a working state, and when the length of the effective portion is less than the preset value, the second component force is reduced to allow the transmission member to slide relative to the spool and the trimmer head is in a line-feeding state.

13. The trimmer head according to claim 12, wherein the trimmer head rotates in constant speed when the trimmer head is in the working state or the line-feeding state.

14. The trimmer head according to claim 11, wherein the transmission member is sleeved on the spool through the aperture and is capable of rotating with the spool synchronously.

15. The trimmer head according to claim 11, wherein the limiting portion is formed or coupled to the spool and the limiting portion is capable of limiting a displacement of the transmission member around a circumference of the rotation axis.

16. The trimmer head according to claim 11, wherein when the length of the effective portion is less than a preset value, the transmission member slides along the straight line so that the driving portion is separated from a first teeth and the head housing is formed or coupled with a second teeth capable of driving the transmission member to reset.

17. The trimmer head according to claim 16, wherein the first teeth and the second teeth are staggered around the rotation axis.

18. The trimmer head according to claim 16, wherein each of the second teeth comprises a first end and a second end, the second end is closer to the rotation axis relative to the first end, and the second end and the first end are arranged in different radial directions so that a return surface is capable of pushing the transmission member to reset.

19. The trimmer head according to claim 11, wherein when the trimmer head is driven by a motor to rotate around the rotation axis, the transmission member has a friction force relative to the spool in the straight line perpendicular to the rotation axis and the direction of a frictional force is opposite to the direction of the centrifugal force generated by the transmission member.

\* \* \* \* \*